United States Patent [19]

Hunsicker

[11] 3,992,588

[45] Nov. 16, 1976

[54] MULTIPLE DIGIT DIALING MODULE

[75] Inventor: William R. Hunsicker, Lakeland, Fla.

[73] Assignee: Akzona Incorporated, Asheville, N.C.

[22] Filed: June 25, 1975

[21] Appl. No.: 590,003

[52] U.S. Cl. .......................... 179/6.3 R; 179/90 D; 179/18 DA
[51] Int. Cl.² ........................................ H04M 17/00
[58] Field of Search ............... 179/6.3 R, 6.4, 6.5, 179/18 DA, 90 D, 189 D

[56] References Cited
UNITED STATES PATENTS

| | | | |
|---|---|---|---|
| 3,406,256 | 10/1968 | Stromben | 179/6.3 R |
| 3,657,481 | 4/1972 | DiMassimo | 179/6.3 R |
| 3,702,903 | 11/1972 | Barton | 179/18 DA |
| 3,757,055 | 9/1973 | McCann et al. | 179/90 D |
| 3,804,984 | 4/1974 | Yachabach | 179/6.3 R |

Primary Examiner—Kathleen H. Claffy
Assistant Examiner—Gerald L. Brigance
Attorney, Agent, or Firm—Francis W. Young; David M. Carter

[57] ABSTRACT

A circuit for providing coin-free dialing of a predetermined number of digits is provided for use with a telephone pay station. A signal generator to provide a pulse in response to each telephone number dialed is included. The signal generator is connected to a counter for providing an output signal after counting a predetermined number of pulses. A phantom coin circuit is connected to the counter and to the telephone central office for simulating the existence of a coin to the central office to cause the central office to accept the dialing signals. Another circuit is provided for prevention of fraudulent push-button chain-dialing. This fraud prevention circuit includes a timing circuit and a latch which effectively shunts the push-button dial if chain-dialing is attempted.

9 Claims, 1 Drawing Figure

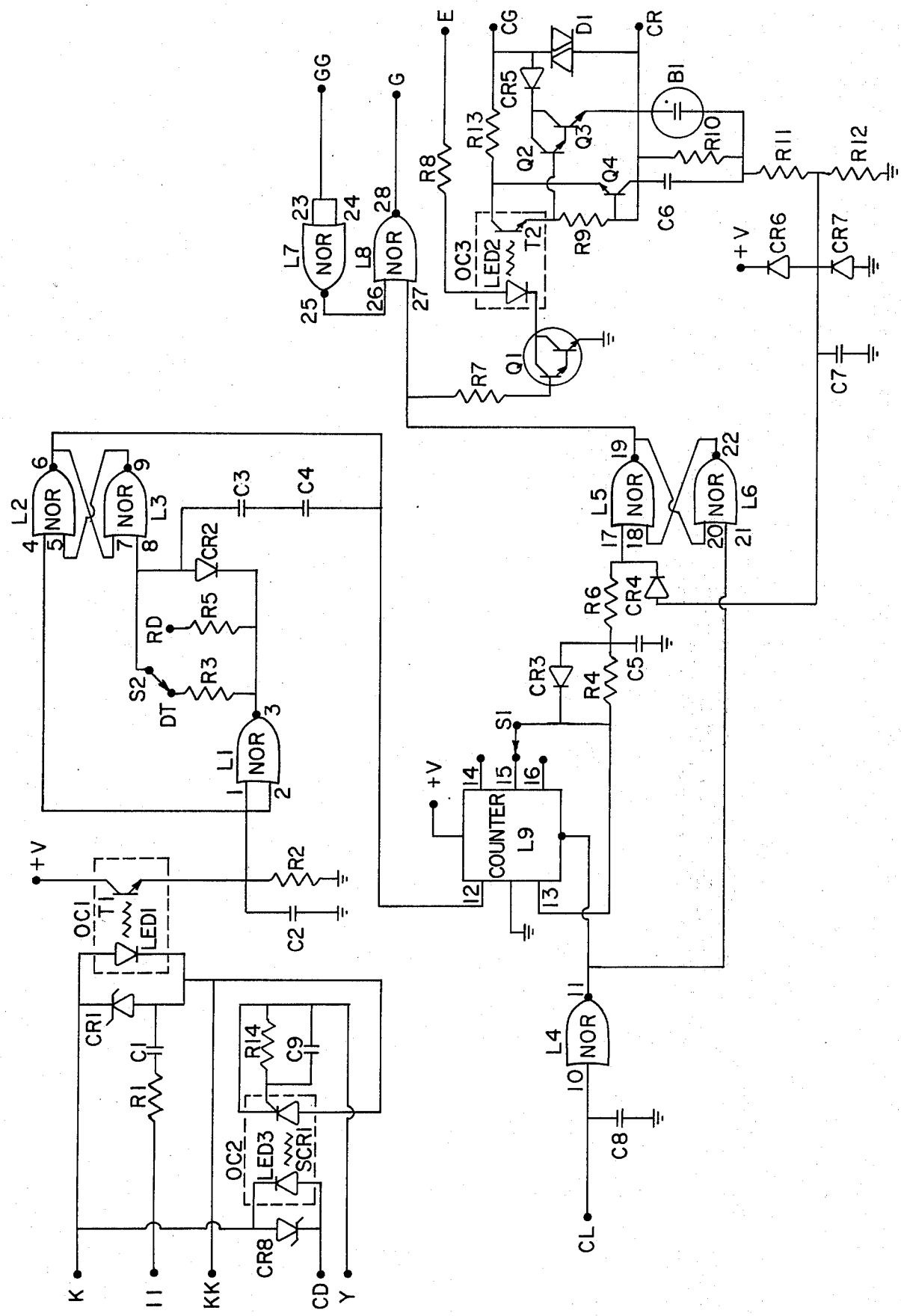

MULTIPLE DIGIT DIALING MODULE

BACKGROUND OF THE INVENTION

This invention relates to a circuit for use with a telephone pay station for providing coin-free dialing of a preselected number of digits as well as a circuit for the prevention of fraudulent push-button chain-dialing. More particularly, it relates to a circuit for providing a phantom coin signal to a telephone central office for a predetermined number of digits dialed as well as a means for shunting the push-button dial if fraudulent chain-dialing is attempted.

Telephone pay stations using both rotary and push-button dialing are currently in wide use. A coin must be inserted in most pay stations in order to dial any number whether it be one, three, or any number of digits. Some of these numbers, such as one digit (operator) and three digits (information, emergency, or service calls) have been designated as free calls. Once the coin has been inserted and the call made, the central office, either manually or electronically, refunds the coin. This method of operation prevents what may be an emergency call because the potential caller lacks the proper coin. It is therefore desirable to provide a pay station having coin-free service for certain numbers such as information and emergency numbers.

Limited coin-free service has been provided in the past utilizing mechanical relays and mechanically counter to prevent more than a preselected number of digits to be dialed. An example of such a circuit is set forth in U.S. Pat. No. 3,678,203. This relay type circuit, however, is subject to contact wear, coin totalizing limits, mechanical failures, and therefore requires frequent servicing.

Another type of coin-free service is shown in U.S. Pat. No. 3,676,597. This patent shows central office equipment used to decode the dial pulse and provide coin-free service from a normal pay station. The present invention does not require replacement or modificaton of central office equipment but only the addition of a circuit module to a pay station where coin-free dialing is desired.

OBJECTS OF THE INVENTION

One of the objects of the invention is to provide coin-free dialing service for a predetermined number of dialed digits.

Another object is to provide a circuit for use in a pay station for providing an indication to the central office of the presence of a phantom coin for a predetermined number of dialed digits.

Another object is to provide a circuit for coin-free dialing of a predetermined number of digits having a means to indicate the presence of a phantom coin to the central office and a means for removing the phantom coin when the central office sends its coin disposal signal.

Another object is to provide a circuit for use with a pay station having coin-free dialing where fraudulent chain-dialing is prohibited.

SUMMARY OF THE INVENTION

In accordance with one form of this invention, there is provided an electrical circuit for use with a telephone pay station, including a signal generating means responsive to a telephone number which has been selected. An electronic counter is connected to the signal generating means for providing one count for each dial pulse train or each push button selected. A phantom coin circuit is connected to the counter for providing an indication to the central office that a coin is present thereby allowing the call to be placed. A means for removing the phantom coin is connected to the phantom coin circuit and operator in response to the coin disposal signal from the central office.

There is further provided a circuit for prevention of fraudulent push-button chain-dialing in a pay station having coin-free operation. This fraud prevention circuit includes a latch connected across the push-button dial and a timing circuit connected to the latch for turning on the latch when a push button has been depressed on the push-button dial for a predetermined time thereby shorting the push-button dial and preventing any further dialing until all push buttons have been allowed to return to their normal released positions.

BRIEF DESCRIPTION OF THE DRAWING

The subject matter which is regarded as the invention is set forth in the appended claims. The invention itself together with further objects and advantages hereof may be understood by reference to the following description taken in conjunction with the accompanying drawing in which:

The Figure is a schematic circuit diagram of one embodiment of the invention.

DESCRIPTION OF THE PREFERRED EMBODIMENT

Referring now more particularly to the figure, input terminal K is connected to a source of positive voltage. Terminals K and 11 are utilized only if the pay station is a rotary pay station. Input terminals Y, KK and CD are used only if the pay station is a push-button dial type pay station. Input terminal CL is connected to the normal electronics of the telephone and a signal is provided at input terminal CL when the telephone receiver is taken off the hook.

For the sake of simplicity, reference will be made mainly to the operation using the push-button dial mode of operation. The push-button dial input is connected across input terminals KK and CD. Light emitting diodes LED1 and LED3 are connected in series between KK and CD. Zener diodes CR1 and CR8 are connected across the light emitting diodes to provide transient protection for the light emitting diodes. LED1 is optically coupled to light responsive transistor T1. This coupling isolates the remainder of the circuit from the high voltage input. The emitter of transistor T1 is connected to the input terminals 1 and 2 of NOR gate L1 which is utilized as an inverter. The emitter of transistor T1 is further connected to input terminal 4 of NOR gate L2. NOR gates L1, L2 and L3, C3, C4, CR2 and R3 function as a oneshot multi-vibrator; i.e. each dial train or tone signal causes the one shot to change state after which it returns to its original state.

The output 3 of L1 is connected to the input terminal 8 of L3 through resistor R3. Capacitors C3 and C4 are also connected to the input terminal 8 of L3 in order to provide a time constant for the voltage to reach the threshold of L3. Diode CR2 is connected across resistor R3 to allow L1 to pull terminal 8 of NOR gate L3 to a low condition very quickly while allowing the voltage on terminal 8 to rise slowly.

The output 6 of L2 is connected to the clock input 12 of digital counter L9. Counter L9 also has reset input 29 for clearing the counts from the counter. Reset input 29 is connected to inverter L4. The input 10 of inverter L4 is connected to the telephone electronics (not shown) for resetting the counter when the phone is taken off the hook. This particular counter has output terminals 14, 15 and 16 which provide an output signal thereon when the total number of counts respectively are 1, 3, and 4. Other combinations of counts may be selected. Switch S1 may be connected to any one of these three outputs for providing a preselected number of digits to be dialed on a coin-free basis. In this embodiment, the output 15 of L9 is connected to a bistable multi-vibrator including NOR gates L5 and L6 acting as a latch. Input 17 of NOR gate L5 is connected to the L9 through resistor R6 and diode CR3. The output 19 of L5 is connected to the input 27 of NOR gate L8. The other input 26 of L8 is connected to the output 25 of L7. L7 acts as an inverter whose inputs 23 and 24 are connected to the coin determination portion of the telephone electronics (not shown) which indicates when the correct revenue has been deposited. The output 19 of L5 is also connected to the base of Darlington transistor Q1 through resistor R7. The collectors of transistor Q1 are connected to a voltage source through light emissive diode LED2 and resistor R8. LED2 is optically coupled to light responsive transistor T2. The emitter of transistor T2 is connected to the base of transistor Q2. Transistor Q4 is connected as a Zener diode to protect the phototransistor T2 from over voltage conditions. Transistor Q2 and Q3 are connected as a Darlington pair with the main current path being through transistor Q3. The collector of transistor Q3 is connected to earth ground through diode CR5 and output terminal CG. The emitter of transistor Q3 is connected to output terminal CR. The terminals CG and CR parallel the trigger contacts of the coin relay which electronically signal the telephone central office that a coin is present.

When transistor Q3 conducts, it acts as the phantom coin ground; that is, when output terminal CR is approximately shorted to earth ground at CG, then the central office receives a signal that there must be a coin in at the pay station and therefore is conditioned to accept dialing signals. Certain central offices will know that certain numbers (O, 113, 911, etc.) should be toll free and will send back a 130-volt pulse to CR in order to activate a coin refund mechanism. Gas tube B1 is connected to CR and responds to the 130-volt pulse from the central office. Capacitor C6 is connected across gas tube B1 in order to filter high frequency noise. Resistor R10 is connected across capacitor C6 in order to bleed off the charge of the capacitor. B1 is further connected back to input 17 of the multi-vibrator latch including L5 and L6 through resistor R11 and diode CR4. Energization of B1 provides a pulse which changes the state of the latch thus removing the phantom coin ground. This will be explained later in the operation of the circuit.

Resistor R12, diode CR7, and capacitor C7 are connected in parallel and to ground and to resistor R11. Diode CR6 is connected to the source of positive voltage and to diode CR7. Diode CR6 and CR7 limit the voltage swing of the pulse through gas tube B1 in order to protect NOR gate L5.

In another part of the circuit there is provided a means for the prevention of fraudulent push-button chain-dialing which might occur in the use of this coin-free circuit. An SCR1 is connected across the push-button dial at KK and Y. This SCR is provided to short the push-button dial if a party tries to fraudulently dial more than the preselected coin-free numbers, such as by pushing a succeeding digit button down while holding the previous digit button and then releasing the previous button. This holding down would cause the signal generator to provide only one output pulse even though seven or more digits were dialed thus allowing a fraudulent coin-free call.

The anode of the SCR1 is connected to KK and the cathode of the SCR is connected to Y. The SCR is an optical SCR which has a light responsive gate. The light responsive gate is optically coupled to LED3. LED3 is connected to inputs KK and CD through LED1. The fraud prevention circuit further includes a timing circuit including resistor R14 and capacitor C9 connected in parallel and to the gate and cathode of the SCR. When a gating signal through the LED is applied for longer than a predetermined time, then the SCR is turned on and latches on thus shorting the push-button dial and not allowing any more dialing signals to be generated until all buttons are allowed to return to the release position. Only then will SCR1 turn off and remove the short from the push-button dial.

The circuit described above operates in the following manner:

When the telephone receiver comes off hook, the telephone electronics are powered up providing power for the circuit. Capacitor C8 charges to the input voltage provided on CL. When the threshold voltage of L4 is reached, the signal is inverted on its output terminal 11. This applies a reset pulse to L9 and flip-flop L5 and L6, This clears all the counts out of counter L9 and establishes a one at output 19 of L5. This provides a positive voltage on the base of transistor Q1 through resistor R7, turning Q1 on and allowing current to flow through resistor R8 and light emitting diode LED2. This turns on light responsive transistor T2 and current flows from CG through this light responisive transistor and resistor R13. Darlington transistors Q2 and Q3 conduct current from CG through diode CR5 and Q3 to ouput terminal CR. Conduction of transistor Q3 will indicate to the central office which is connected to CG and CR that a coin must be present and that dialing signals are to be accepted from the pay station even though coin is a so called phantom coin.

Most central offices are geared to send a coin refund signal back to the pay station in order to refund the coin when a non-revenue call is placed. This signal is normally a 130-volt signal applied to CR. Therefore there needs to be special circuitry for removing the phantom coin or otherwise the central office would continue to send these 130-volt pulses because the central office coin test circuit (not shown) would continue to see a coin signal present. The 130-volt pulse exceeds the firing voltage of the gase tube B1 which in this embodiment is a 65-volt threshold tube. When the voltage on capacitor C6 exceeds 65 volts, it discharges through B1. This sends a signal back to input terminal 17 of L5, thus causing the flip-flop to change its state from 1 to 0 at output 19. The Darlington transistor Q1 turns off which causes light emitting diode LED2 to stop emitting light. Light responsive transistor T2 turns off thus turning off Darlington transistors Q2 and Q3. When transistors Q3 is off, the phantom coin signal is terminated. The central office detects the lack of a coin signal and no longer sends out the 130-volt refund pulses. Diode CR6 and CR7 are connected to clip the high positive and negative swings of the refund signal so as not to apply too high a voltage to the logic circuitry. This refund pulse, of course, would occur normally after a certain number of digits have been dialed.

When one digit is pressed, a voltage is applied on KK and current travels through LED1 and LED3 to CD. LED1 applies light to the base of transistor T1, which is light responsive, thus causing current to conduct through this transistor charging capacitor C2. When the capacitor C2 is charged with a sufficient voltage to overcome the threshold of inverter L1 and NOR gate L2, a logic zero is applied to the output 3 of L1. This causes the one shot L2 and L3 to change state and apply one on output 6 of L2. This one output lasts until the push-button dial pulse or rotary dial pulse train is completed. When the dial pulse or train is completed, the one shot goes back to its original state because of the feedback pulse applied through capacitor C3 and C4 to input 8 of L3. Counter L9 in this embodiment responds only to the transition of the logic zero to a logic one from the output terminal 6 of L2. Each transition is counted and the total indicated on output pins 14, 15 or 16 of L9. When the predetermined number of digits, as determined by the portion of S1, have been dialed and counter L9 has exceeded the number of preselected counts, then the state of L5 and L6 is changed to remove the phantom coin ground as was done in the same manner when the central office applied its 130-volt pulse to CG. Furthermore, when the state of L5 and L6 is changed, an output of zero is applied to input 27 of NOR gate L8. This applies an output of 1 to output 28 and output terminal G which causes the pay station electronics to shunt the pay station dial. The one on input 27 of L8 causes the path from CG to L to become a straight through path, thereby returning the pay station to its normal toll operation allowing it to shunt or not to shunt the dialing means depending on whether sufficient revenue has been deposited.

In order to prevent fraudulent chain-dialing, a circuit is provided at the push-button input for shunting the push-button dial when a tone has lasted for a predetermined time. Current flows from terminal KK through LED1 and LED3 and to terminal CD which is also connected to the push-button dial. The LED3 illuminates photo SDR1 and the capacitor C9 charges. The charge time is determined by resistor R14 and the value of the capacitor. If the push button is held down for longer than the predetermined time as determined by this capacitor-resistor combination, the SCR fires thus placing a short across the push-button dial and prevents any further push-button dialing. All buttons must be released between each valid button push.

The circuit has been built and operated with components having the following set of values:

Resistor R1 — 100 ohm
R2, R3, R6, R7 — 100 K
R4 — 680 K
R5, R9 — 1 M
R8 — 1.5 K
R10 — 3 M
R11 — 220 K
R12 — 22 K
R13 — 50 K
R14 — 10 K
Capacitor C1 — .33 uF
C2, C6, C8 — 1 uF
C3, C4, C5 — 1 uF
C7, C9 — 10 uF
Diodes CR1, CR8 IN4370 zener
CR2, CR3, CR4 — IN4148
CR5 — IN4004
CR6, CR7 — IN4004
DI — GEMOV VARISTOR
Gas Tube b1 — a-286 neon
Transistors Q1 — 2N5306 Darlington
Q2, Q3 — MJE 340
Q4 — 2N2222
Logic circuits L1, L2, L3, L4 — 4001
L9 — 4017
L5, L6, L7, L8 — 4001
Optical Coupler OC1, OC3 — MOC 1003
OC2 — GEH11C2

In the foregoing description of the exemplification of the invention, it will be apparent that many modifications may be made therein. It will be understood therefore that this embodiment is intended as an exemplification of the invention only and the invention is not limited thereto. It will be understood therefore that it is intended in the appended claims to cover all such modifications as falls within the true spirit and scope of the invention.

What is claimed is:

1. An electrical circuit for use with a telephone pay station comprising: a first input means for connection to a telephone number selection means;
    a second input means adapted to be connected to the telephone hook switch;
    means for generating a signal in response to each digit of the telephone number which has been selected, said signal generating means being connected to said first input means;
    a digit counter connected to said signal generating means;
    output means adapted to be connected to a telephone central office;
    a phantom coin circuit; means for controlling said phantom coin circuit connected to said counter; said phantom coin circuit connected to said output means for providing an output signal on said output means in response to a signal on said second input means whereby a phantom coin is indicated to be present by the output signal on said output means;
    first means for removing said output signal from said output means in response to a predetermined number of telephone digits selected; said first means including said digit counter.

2. A circuit as set forth in claim 1 further including second means for removing the output signal from said output means in response to a predetermined signal from the central office, said second means for removing being connected to said means for controlling said phantom coin circuit.

3. A circuit as set forth in claim 1 further including a fraud preventive circuit connected to said input means for shorting the telephone number selection means in response to a signal on said input means for a predetermined duration.

4. A circuit as set forth in claim 1 wherein said signal generating means includes a one-shot circuit for applying a signal to said counter in response to each telephone digit selected at the telephone number selection means.

5. A circuit as set forth in claim 1 wherein said phantom coin circuit includes a switch means connected to said output means for shorting said output means.

6. A circuit as set forth in claim 1 wherein said means for controlling said phantom coin circuit includes a bistable circuit.

7. An electrical circuit for preventing fraudulent chain-dialing and adapted for use with a telephone pay station comprising:
- a pair of input terminals adapted to be connected across a telephone number selection means;
- a latch having first, second, and third electrodes, said first and second electrodes connected to said input terminals;
- a timing circuit connected to said third electrode, said timing circuit enabling said latch to come on when signal on said input terminal is present for a predetermined time thereby shorting the number selection means.

8. A circuit as set forth in claim 7 wherein said latch includes an SCR and said timing circuit includes a resistor and a capacitor connected to the gate of said SCR.

9. An electrical circuit for use with a telephone pay station comprising:
- first input means adapted to be connected to a number selection means;
- signal generating means including a one-shot multi-vibrator; said signal generating means connected to said first input means;
- a signal digit counter responsive to said signal generating means;
- a second input means adapted to be connected to a telephone switch and to said counter for resetting said counter;
- a bistable multi-vibrator responsive to said second input means for a first state and responsive to said counter for a second state in response to a predetermined number of telephone digits selected;
- a phantom coin circuit connected to said bistable multi-vibrator, said phantom coin circuit including a first switch means;
- output means connected to said first switch means; said first switch means being turned on in response to the first state of said bistable multi-vibrator and being turned off in response to said second state of said bistable multi-vibrator;
- a second switch means connected to said output means and responsive to a signal from the telephone central office for initiating said bistable multi-vibrator into said second state whereby said first switch means is turned off.

* * * * *